INVENTORS
EDWARD V. THOMAS
THOMAS F. RANSICK

United States Patent Office 3,448,713
Patented June 10, 1969

3,448,713
SILENT PROPULSION SYSTEM FOR SUBMERSIBLE VEHICLES
Edward V. Thomas, Severna Park, Md., and Thomas F. Ransick, Rockford, Ill., assignors to the United States of America as represented by the Secretary of the Navy
Filed Jan. 10, 1968, Ser. No. 696,735
Int. Cl. B63h *11/08*
U.S. Cl. 114—151                              7 Claims

ABSTRACT OF THE DISCLOSURE

A hydrodynamic jet propulsion system for submersible vehicles has an annular nozzle about the periphery of the body of said vehicle with thrust augmenting vanes which control the surface flow conditions of the orifice to thereby control output flow direction. A multi-vane pump impeller derives its input from an orifice in the nose of the vehicle and directs its output to the annular nozzle. The thrust augmenters when separated from the walls of the nozzle provide step discontinuity in the flow stream forming a vortex at the wall of the nozzle, which directs the output flow to the rear or the front, depending on the direction of travel desired.

---

The invention described herein may be manufactured and used by or for the Government of the United States of America for governmental purposes without the payment of any royalties thereon or therefor.

Background of the invention

Prior art propulsion systems, such as the screw propeller type and the jet propulsion type, suffer from the disadvantage that pulsations are caused by the limited number of propeller blades producing vibrations in the hull of the vehicle, or high level turbulence in the jet. Generation of noise makes the existence and position of the submersible vehicle readily detectable by another vehicle. Even recent jet propulsion systems product considerable noise by pump action and jet stream turbulence.

Summary of the present invention

The present invention does not have the disadvantages of the prior art in that it provides a propulsion system for submersible vehicles which is relatively quiet and in which the thrust direction is easily controllable for forward, back, pitch and yaw movement of the vehicle.

The present invention relates generally to hydraulic jet propulsion systems and more particularly to a propulsion system which utilizes the buoyant medium as the thrust producing means. An impeller is provided which inducts fluid through an orifice in the nose of the submersible vehicle and directs its output flow through a radial nozzle perpendicularly to the direction of vehicle travel. Thrust direction means in the form of movable thrust augmenter vanes are located within the nozzle to effect flow direction from an output orifice. The thrust augmenter vanes are retractable to flush positions within the nozzle and extendable to positions causing turbulence along the nozzle wall. The effect of the turbulence is to cause a Coanda effect thereby directing propulsion fluid from a predetermined side the nozzle orifice thus effectuating directional propulsion of the vehicle.

Accordingly, it is the principal object of this invention to provide a propulsion system which is relatively quiet in operation.

Still another object is to provide a steerable propulsion system which obtains its propulsion medium from the buoyant fluid at the bow of the vessel and exhausts the medium through an annular nozzle about the body of the vessel.

Yet another object of the present invention is to provide a propulsion system wherein the direction of travel may be controlled by thrust augmenter vanes in the propulsion path.

Other objects and features of the invention will become apparent to those skilled in the art upon reference to the accompanying specification, claims and drawings in which:

Description of the preferred embodiment

Figure 1:
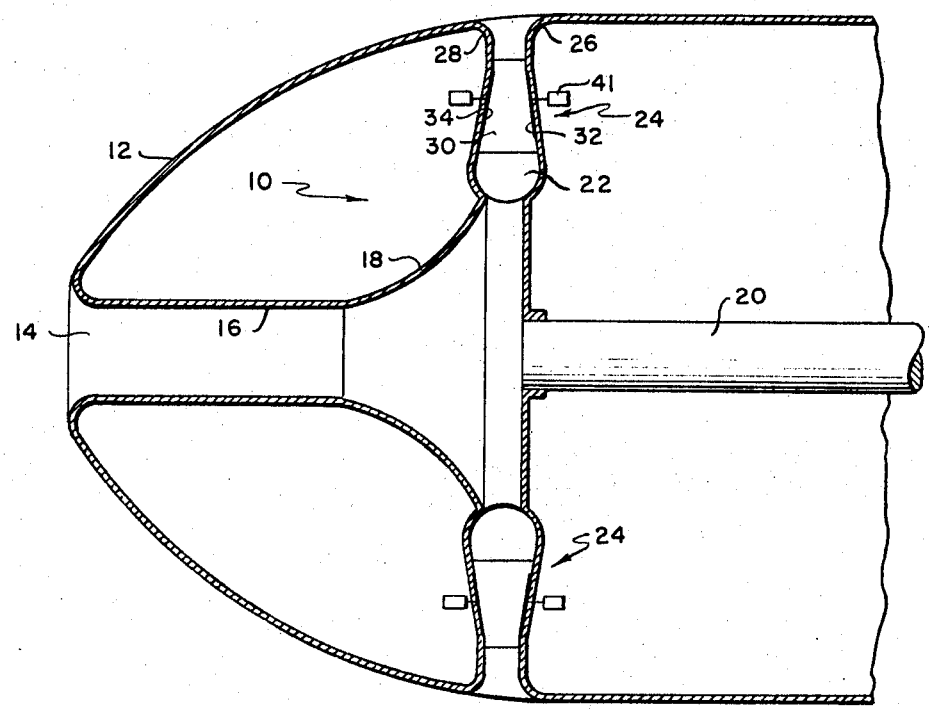
FIG. 1 is a cross-sectional elevation view of propulsion system in the nose of a vessel.
Figure 2:
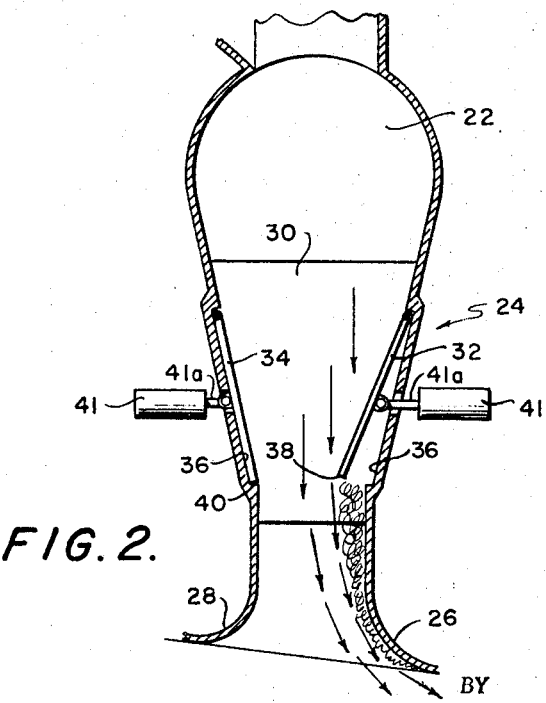
FIG. 2 is a detailed cross-sectional view of the annular converging nozzle connected to the toroidal cavity and showing the nozzle exhausting out the side of the vessel.

Referring now to FIGS. 1 and 2, there is shown the propulsion system 10 located in the nose of the vessel 12. The propulsion system 10 generally comprises an intake port located in the bow or nose of the vessel 12. In the case of the torpedo or a submersible vessel having a hull in the configuration of a body of rotation, the intake port 14 will be on the geometric axis of the body. The intake port 14 is connected by a conduit 16 to the induction side of a centrifugal impeller 18. The impeller 18 is affixed to a shaft 20 for rotation therewith, the shaft 18 being further connected to a source of rotational power (not shown). The discharge of the impeller 18 is radially directed to a toroidal cavity 22 for centrifugal discharge thereto.

Figure 3:
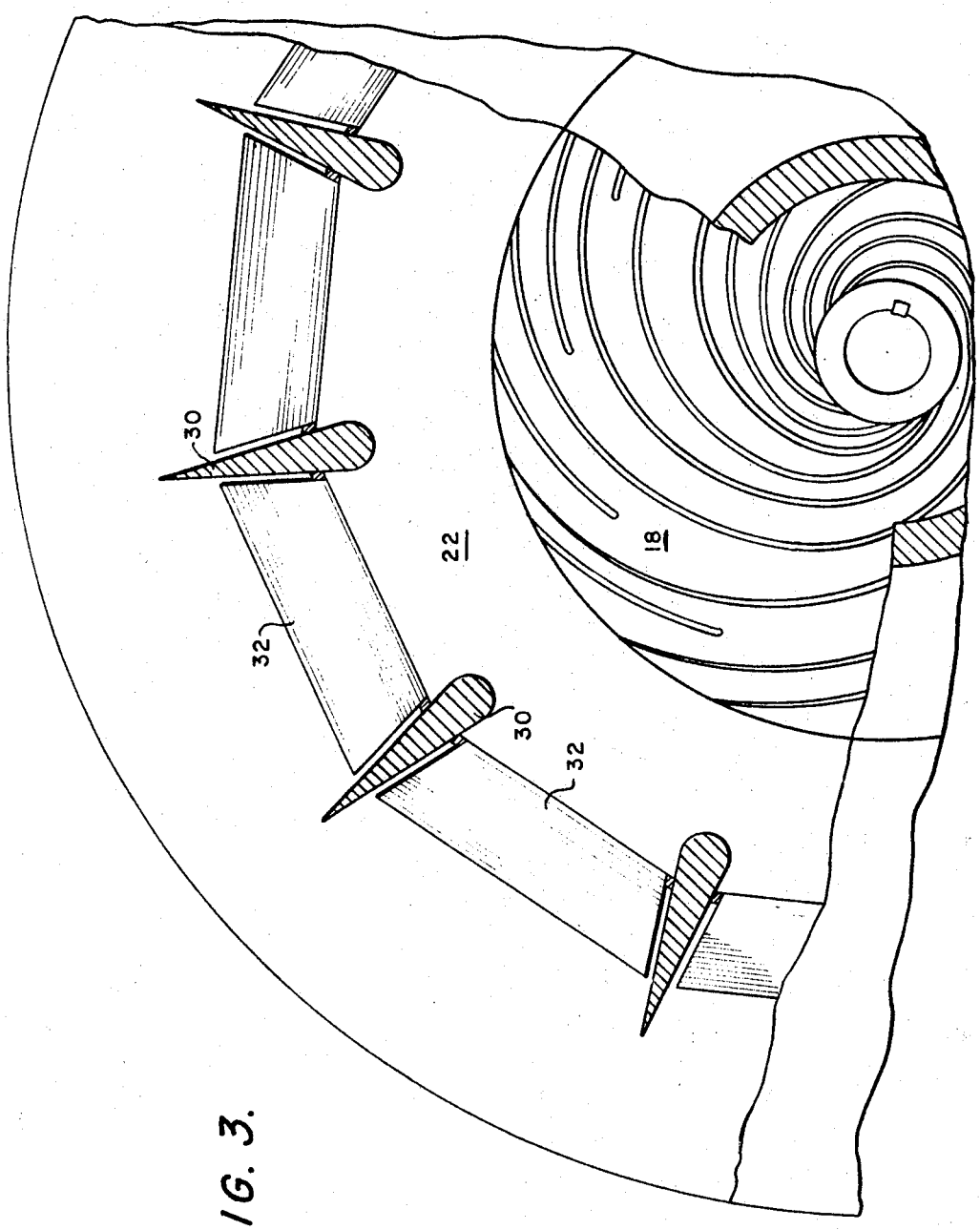
FIG. 3 is a transverse cross-sectional view showing the impeller, the cutwaters and thrust augmenter vanes.

The toroidal cavity 22 extends outwardly from the axis of the vessel to form a radially directed annular nozzle 24 having convergent and divergent portions. The annular nozzle 24 is provided with a diverging rounded-edge exit orifice having fore and aft curved portions 26 and 28, respectively. Radially oriented stationary cutwater vanes 30 are angularly spaced about the axis of rotation within the convergence section of the nozzle. As shown in FIG. 3 the cutwater vanes 30 are oriented with their chord lines perpendicular to the pumpshaft 20 and axis of rotation of the body. Augmenter vanes 32 and 34 as shown in FIGS. 2 and 3 are attached for limited movement within the converting nozzle and adjacent to the cutwater vanes 30. One set of thrust augmenter vanes 32 is provided in the after-wall of the annular converting nozzle 24 and another set 34 is provided in the forward wall of the converting annular nozzle. The augmenter vanes 32 and 34 are fitted so that they may lie flush with the forward and after walls of the converting annular nozzle. The augmenter vanes 32 and 34 may be positioned in their respective complementarily shaped cavities 36 so that the forward and aft walls of the converting annular nozzle 24 are smooth and have no step discontinuity when the augmenter vanes are retracted therein. In this case the propulsion medium is caused to flow unobstructedly from the nozzle radially through the nozzle orifice to the sides of the vehicle. The cutwater vanes 30 serve to straighten the circular component flow which may exist in the nozzle output.

To reduce the helical flow within the toroidal cavity 22 to a minimum before entering the nozzle 24, the impeller 18 is provided with vanes of backward curved construction as shown in FIG. 3. Preferably, the impeller has a plurality of vanes spaced axially along its length to split the flow so as to further reduce noise.

Description of the operation

The operation is discussed as it relates to vehicles having a body of rotation about a central axis, such as a submarine, a submersible vehicle or the like. The impeller 18 is rotated by the shaft 20. Water is inducted through port 14 in the nose of the vehicle and drawn through the tube 16 into the induction side of the impeller. The pressure of this water is increased by the operation of the impeller 18 and is exhausted radially into the toroidal cavity 22 at an increased pressure. The backward curved construction of the vanes in the impeller eliminates most of the helical motion of the water in the toroidal cavity 22. The pressurized water in the toroidal cavity 22 is subsequently forced from the converging portion of the annular nozzle 24 wherein the streamlined low-drag cutwater vanes 30 are placed. These cutwater vanes 30 straighten out any remaining helical flow from the toroidal cavity 22 so that the propulsion fluid exits perpendicularly (i.e. radially) to the axis of rotation of the impeller 18.

The converging portion of annular nozzle 24 is further provided with thrust augmenter vanes 32 and 34 which, according to the invention, are extendable into the flow path as shown in FIG. 2 to create a step discontinuity at fore and aft points 38 or 40, depending on the desired direction of travel of the vehicle 12. Any suitable control means, such as hydraulic actuator 41 and rod 41a, may be employed for selective movement of the augmenter vanes. These step discontinuities at points 38 and 40 create eddy currents or surface vortexes which reduce the pressure at either the after or forward wall of the converging annular nozzle. This reduction in pressure causes the flow stream to hug the corresponding wall of the annular nozzle. The flow path continues in an arc due to the Coanda effect at the round edge portion of the exit nozzle at point 26 and point 28.

FIG. 2 shows a cross section of the toroidal chamber 22 and the converging annular nozzle 24 where the thrust augmenter vane 32 is displaced from its cavity 36 to create the surface vortex reduced pressure area at point 38, when forward motion is desired of the vessel. The thrust augmenter vane 34 used for reverse motion is shown in its cavity 36 so that there is no step discontinuity at point 40 and the forward wall is substantially smooth and flush. Therefore, there is no surface vortex or reduced pressure area produced on the forward wall of the nozzle and substantially all the flow is directed towards the rear thereby creating reaction thrust which drives the vessel in a forward direction.

In the case of a vessel such as a submarine, where reverse direction of the vessel is desired, the rear thrust augmenter vane 32 is retracted into its cavity 36 creating a smooth rear wall in the converting annular nozzle, and the forward thrust augmenter vane 34 is positioned into the flow stream out of its cavity 36 thus creating a step discontinuity on the forward wall. As discussed previously, the positioning of the thrust augmenter vane in the flow stream creates a surface vortex or low pressure area causing the flow stream to be pulled towards that wall and when exiting the nozzle near the skin the flow stream is further bent towards the forward end of the vessel by the Coanda effect due to smooth rounded edge at point 28.

As can be seen in FIG. 3 there is a plurality of thrust augmenter vanes separated by the streamlined cutwater vanes 30. By selective control of movement of the augmenter vanes forward and reverse motion and the fore and aft attitude of the vehicle may be controlled. Positioning both thrust augmenter vanes 32 and 34 in the respective cavities 36 thereby creates a flow path perpendicular to the line of direction of the vessel. For "nose-up" attitude, the thrust augmenter vanes in the upper section of the vehicle are positioned for forward motion, that is with thrust augmenter vanes 32 extending into the flow stream, while both the forward and aft of ones of the lower thrust augmenter vanes are positioned in their cavities 36 so that thrust is acting directly downward. Thus it can be seen in many combinations in the position of the thrust augmenter vanes it is possible to effect forward and reverse motion as well as to effect changes in pitch and yaw attitudes of the vehicle.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A hydrodynamic jet propulsion system for submersible vehicles comprising:
   means providing an annular nozzle in the peripheral body portion of the vehicle for discharging a fluid essentially perpendicularly outward of said body;
   a source of fluid;
   pump means mounted in the vessel discharging the fluid into said annular nozzle essentially, radially; and
   body means mounted within said annular nozzle for producing turbulence along a wall portion of said nozzle to control the direction of flow of fluid discharging from said nozzle by the Coanda effect.

2. The propulsion system of claim 1 wherein said body means are positioned in said annular nozzle for movement therein to produce two conditions:
   a step discontinuity in the wall of said annular nozzle when said body means is extended therein; and
   a smooth surface flush with the wall of said annular nozzle when said body means is retracted.

3. The propulsion system of claim 2 wherein said pump means comprises an impeller and said source comprises an intake in the nose of the vehicle, said system further comprising a plurality of streamlined cutwater vanes mounted within said annular nozzle and angularly spaced about the axis of rotation of said impeller for enhancing radial flow of said fluid through said nozzle.

4. The propulsion system of claim 3 wherein the leading edges of said plurality of cutwater vanes are spaced in radial distance from the output circumference of said impeller.

5. The propulsion system of claim 4 including a toroidal cavity located contiguously to said impeller and nozzle.

6. The propulsion system of claim 5 wherein said impeller has multiple vanes axially spaced to reduce pressure pulsations in said toroidal cavity.

7. The propulsion system of claim 2 wherein the junction of said annular nozzle and the body of the vessel is a smooth, gentle curve for minimizing flow disturbances in said fluid as it passes from said nozzle.

References Cited

UNITED STATES PATENTS

| | | | |
|---|---|---|---|
| 2,699,644 | 1/1955 | Coanda | 115—16 |
| 2,946,540 | 7/1960 | Coanda | 244—42 |
| 3,259,096 | 7/1966 | Bowles | 114—151 |
| 3,302,605 | 2/1967 | Kuether | 115—12 |

ANDREW H. FARRELL, *Primary Examiner.*

U.S. Cl. X.R.

115—12; 244—42